US012602152B2

(12) United States Patent
Beauchamp et al.

(10) Patent No.: US 12,602,152 B2
(45) Date of Patent: *Apr. 14, 2026

(54) SYSTEMS AND METHODS TO PROVIDE PERSONALIZED GRAPHICAL USER INTERFACES WITHIN A COLLABORATION ENVIRONMENT

(71) Applicant: Asana, Inc., San Francisco, CA (US)

(72) Inventors: Tyler Jeffrey Beauchamp, Bismark, ND (US); Louis Benjamin Lafair, Berkeley, CA (US); Eric Ming-Ming Zhao, San Diego, CA (US); Johanna Nancy Pajak, Richmond, CA (US); Luke Richard Puglisi, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/663,916

(22) Filed: May 14, 2024

(65) Prior Publication Data

US 2024/0310990 A1 Sep. 19, 2024

Related U.S. Application Data

(63) Continuation of application No. 18/173,353, filed on Feb. 23, 2023, now Pat. No. 12,039,158, which is a
(Continued)

(51) Int. Cl.
G06F 3/048 (2013.01)
G06F 3/0482 (2013.01)
G06F 3/04847 (2022.01)

(52) U.S. Cl.
CPC ........ *G06F 3/04847* (2013.01); *G06F 3/0482* (2013.01)

(58) Field of Classification Search
None
See application file for complete search history.

(56) References Cited

U.S. PATENT DOCUMENTS 7,613,688 B2 11/2009 Wiest
7,702,730 B2 4/2010 Spataro
(Continued)

FOREIGN PATENT DOCUMENTS

JP 3973263 B2 9/2007
JP 4315508 B2 8/2009
(Continued)

OTHER PUBLICATIONS

Tsung-Yi Chen, Yuh-Min Chen, Hui-Chuan Chu, Developing a trust evaluation method between co-workers in virtual project team for enabling resource sharing and collaboration, Computers in Industry, vol. 59, Issue 6. (Year: 2008) 15 pages.
(Continued)

*Primary Examiner* — Thanh T Vu

(74) *Attorney, Agent, or Firm* — Esplin & Associates, PC

(57) ABSTRACT

Systems and methods to provide personalized graphical user interfaces within a collaboration environment are described herein. Exemplary implementations may: manage environment state information maintaining a collaboration environment; manage homepage information defining personalized graphical user interfaces of the collaboration environment; effectuate presentation of the personalized graphical user interfaces on computing platforms associated with the users upon instantiation of the collaboration environment by the users via the computing platforms; and/or perform other operations.

20 Claims, 4 Drawing Sheets

Related U.S. Application Data continuation of application No. 17/498,257, filed on Oct. 11, 2021, now Pat. No. 11,635,884.

(56) References Cited

U.S. PATENT DOCUMENTS

| | | | |
|---|---|---|---|
| 8,352,310 B1 | 1/2013 | Bessler | |
| 8,365,065 B2 | 1/2013 | Gejdos | |
| 8,531,447 B2 | 9/2013 | Walker | |
| 8,583,579 B1 | 11/2013 | Seth | |
| 8,909,631 B1 | 12/2014 | Seth | |
| 8,938,690 B1 | 1/2015 | Khouri | |
| 9,122,834 B1 | 9/2015 | Caluya | |
| 9,372,596 B2 | 6/2016 | Breedvelt-Schouten | |
| 9,836,183 B1 | 12/2017 | Love | |
| 9,842,312 B1* | 12/2017 | Rosati | G06Q 10/1053 |
| 10,423,927 B2* | 9/2019 | Hamilton | G06Q 10/06 |
| 10,614,404 B2 | 4/2020 | Guo | |
| 10,867,128 B2 | 12/2020 | Purandare | |
| 11,449,836 B1 | 9/2022 | Clifton | |
| 11,501,063 B2 | 11/2022 | Norota | |
| 11,501,255 B2 | 11/2022 | Mann | |
| 11,657,306 B2 | 5/2023 | Aggarwal | |
| 11,769,115 B1 | 9/2023 | Morales | |
| 2003/0101086 A1 | 5/2003 | San Miguel | |
| 2004/0233235 A1 | 11/2004 | Rubin | |
| 2005/0216830 A1 | 9/2005 | Turner | |
| 2005/0234886 A1 | 10/2005 | Mohraz | |
| 2005/0262081 A1 | 11/2005 | Newman | |
| 2007/0239573 A1 | 10/2007 | Tien | |
| 2008/0033876 A1 | 2/2008 | Goldman | |
| 2010/0169832 A1 | 7/2010 | Chang | |
| 2011/0258582 A1 | 10/2011 | Bang | |
| 2011/0265188 A1 | 10/2011 | Ramaswamy | |
| 2011/0302003 A1 | 12/2011 | Shirish | |
| 2011/0307771 A1 | 12/2011 | Lok | |
| 2012/0041983 A1 | 2/2012 | Jennings | |
| 2012/0210247 A1 | 8/2012 | Khouri | |
| 2012/0226617 A1 | 9/2012 | Kay | |
| 2013/0073963 A1 | 3/2013 | Pendergast | |
| 2014/0075004 A1 | 3/2014 | Van Dusen | |
| 2014/0143000 A1 | 5/2014 | Kay | |
| 2014/0201131 A1* | 7/2014 | Burman | G06F 40/10 |
| | | | 707/608 |
| 2014/0304836 A1 | 10/2014 | Velamoor | |
| 2014/0337279 A1 | 11/2014 | Mo | |
| 2014/0372860 A1 | 12/2014 | Craven | |
| 2015/0007336 A1 | 1/2015 | Zang | |
| 2015/0106736 A1 | 4/2015 | Torman | |
| 2015/0193735 A1 | 7/2015 | Lavrov | |
| 2015/0294253 A1* | 10/2015 | Bhat | G06Q 10/06316 |
| | | | 705/7.26 |
| 2015/0312113 A1 | 10/2015 | Forutanpour | |
| 2015/0363481 A1 | 12/2015 | Haynes | |
| 2016/0241609 A1 | 8/2016 | Xin | |
| 2016/0352812 A1 | 12/2016 | Ahlgren | |
| 2017/0017903 A1 | 1/2017 | Gray | |
| 2017/0262294 A1 | 9/2017 | Yakan | |
| 2017/0286885 A1 | 10/2017 | Azmoon | |
| 2018/0011627 A1 | 1/2018 | Siracusano, Jr. | |
| 2018/0101807 A1 | 4/2018 | Ni | |
| 2018/0190145 A1 | 7/2018 | Nakayama | |
| 2018/0336520 A1 | 11/2018 | Davis | |
| 2018/0349108 A1 | 12/2018 | Brebner | |
| 2018/0349829 A1 | 12/2018 | Peterson | |
| 2019/0102364 A1 | 4/2019 | Rochiramani | |
| 2019/0220936 A1 | 7/2019 | Khalil | |
| 2019/0340518 A1 | 11/2019 | Merrill | |
| 2019/0347515 A1 | 11/2019 | Kehl | |
| 2019/0369857 A1 | 12/2019 | Thomas | |
| 2021/0133162 A1 | 5/2021 | Arnold | |
| 2021/0141996 A1 | 5/2021 | Agrawal | |
| 2021/0192129 A1 | 6/2021 | Garg | |
| 2021/0209239 A1 | 7/2021 | Robinson | |
| 2022/0058334 A1 | 2/2022 | Joshi | |
| 2022/0236860 A1 | 7/2022 | Lee | |
| 2022/0309037 A1 | 9/2022 | Gutierrez | |
| 2023/0061905 A1 | 3/2023 | Culver | |
| 2023/0177465 A1 | 6/2023 | Jiang | |
| 2023/0343027 A1 | 10/2023 | Cazamias | |
| 2024/0019993 A1 | 1/2024 | Rosenstein | |
| 2024/0171621 A1 | 5/2024 | Ye | |
| 2024/0220930 A1 | 7/2024 | Clifton | |
| 2024/0346449 A1 | 10/2024 | Beauchamp | |
| 2024/0386382 A1 | 11/2024 | Adams | |
| 2024/0420086 A1 | 12/2024 | Beauchamp | |
| 2024/0428196 A1 | 12/2024 | Ackerman-Greenberg | |
| 2025/0036863 A1 | 1/2025 | Davies | |
| 2025/0190947 A1 | 6/2025 | Beauchamp | |
| 2025/0292210 A1 | 9/2025 | Ryan | |

FOREIGN PATENT DOCUMENTS

| | | |
|---|---|---|
| JP | 4335340 B2 | 9/2009 |
| KR | 101760051 B1 | 7/2017 |
| WO | 2007064690 A2 | 6/2007 |
| WO | 2015029073 A2 | 3/2015 |

OTHER PUBLICATIONS

Booch, Grady, and Alan W. Brown. "Collaborative development environments." Adv. Comput. 59.1 (2003): 1-27. (Year: 2003).

Heerwagen, Judith H., et al. "Collaborative knowledge work environments." Building research & information 32,6 (2004): 510-528. (Year: 2004).

Luff, Paul, Christian Heath, and David Greatbatch. "Tasks-in-interaction: paper and screen based documentation in collaborative activity." Proceedings of the 1992 ACM conference on Computer-supported cooperative work. 1992. (Year: 1992).

ASANA website; Mar. 12, 2020(https://web.archive.org/web/20200312140636/https://asana.com/guide/help/)(see attached pdf for sublinks) (Year: 2020).

N. S. Jyothi and A. Parkavi, "A study on task management system," 2016 International Conference on Research Advances in Integrated Navigation Systems (RAINS), Bangalore, India, 2016, pp. 1-6, doi: 10.1109/RAINS.2016.7764421. (Year: 2016).

Tao, Xingyu, et al. "Distributed common data environment using blockchain and Interplanetary File System for secure BIM-based collaborative design." Automation in Construction 130 (2021): 103851. (Year: 2021) (pp. 1-22).

W. Noonpakdee, T. Khunkomsiri, A. Phothichai and K. Danaisawat, "A framework for analyzing and developing dashboard templates for small and medium enterprises," 2018 5th International Conference on Industrial Engineering and Applications (ICIEA), Singapore, 2018, pp. 479-483.

\* cited by examiner

400

402

My Tasks:

404

406

408

500

502    Background color

☐ White   ■ Red   ☐ Blue

504

Drag to add to your Homepage:

SYSTEMS AND METHODS TO PROVIDE PERSONALIZED GRAPHICAL USER INTERFACES WITHIN A COLLABORATION ENVIRONMENT

FIELD OF THE DISCLOSURE

The present disclosure relates to systems and methods to provide personalized graphical user interfaces within a collaboration environment.

BACKGROUND

Online web-based collaboration environments, sometimes referred to as work management platforms, may enable users to assign projects, tasks, or other assignments to assignees (e.g., other users) to complete. A collaboration environment may comprise an environment in which individual users and/or a virtual team of users does its work and enables users to work in a more organized and efficient manner when remotely located from each other.

SUMMARY

Hosting a web-based collaboration environment poses many challenges. For example, operating the collaboration environment may require precise ways of creation, storage, management, and/or provision of information that makes up the collaboration environment to its users. One way that operators look to improve the operation of the collaboration environment is to improve parts of the collaboration environment involving substantial human-machine interaction. Some of these improvements may be in the form of improved user interfaces that present information that would otherwise be stored in different records of the environment and/or not otherwise shown in a consolidated view. For example, users may traditionally have to navigate through one or more user interfaces that provide different pieces of information stored in one or more records in order for the users to obtain a more wholistic view of the one or more records—for example, to be able to get an understanding of their current and/or future workload (e.g., what is due, what is past due, what should be prioritized, etc.). This may require a sophisticated knowledge of the collaboration environment because the users are tasked with 1) initially knowing what information may even be relevant to understanding their workload, 2) knowing where and how to navigate through the environment in order to collect the information, and/or 3) organizing and/or consolidating the found information to provide a meaningful overview. This required knowledge of the collaboration environment and the required interactions/navigations through the user interfaces themselves may be time consuming, may cause decreased workflow efficiency, and/or may be prone to user error. Accordingly, the inventors of the present disclosure have identified the need to operate a collaboration environment to include user interface(s) that accurately and effectively present information stored in records of the collaboration environment, as well as reducing the human-machine interventions required to identify the information for these user interfaces and/or generate the interfaces themselves.

One or more aspects of the present disclosure relates to a system configured to provide personalized graphical user interfaces within a collaboration environment. In some implementations, a personalized graphical user interface may be used to provide a summarized view of one or more of ongoing work, people that are frequently collaborated with, units of work that are frequently viewed, projects that are frequently viewed, and/or other information. The personalized graphical user interface may represent a landing page (sometimes referred to as a "homepage") when the users instantiate (e.g., launch) the collaboration environment on their computing platform. Providing users with a personalized graphical user interface may be useful when starting their day. Users may easily prioritize their work and jump into the work that matters most.

One or more implementations presented herein propose a way to provide users with personalized graphical user interfaces that act as dynamic landing pages/homepages for the collaboration environment. The personalized graphical user interfaces may include sets of interface elements presenting information pertinent to the work users are involved in. The information may include one or more of due dates, frequency of collaboration with other users, activity with certain work, and/or other information. By way of non-limiting illustration, the interface elements may present one or more values of one or more parameters that define the collaboration environment. In some implementations, the interface elements may be dynamically updated as the values change. Providing these updated values of parameters may maintain the information in the dynamic homepage to be in its most current state. In some implementations, users may customize the content displayed in the personalized graphical user interface. By way of non-limiting illustration, a customization panel and/or popup window may be provided which allows the user to customize the content (e.g., via widgets that correspond to different records) and/or aesthetic aspects (e.g., color, arrangement, and/or other aspects) of a personalized graphical user interface.

One or more implementations of a system configured to provide personalized graphical user interfaces within a collaboration environment may include one or more hardware processors configured by machine-readable instructions and/or other components. Executing the machine-readable instructions may cause the one or more hardware processors to facilitate providing personalized graphical user interfaces within a collaboration environment. The machine-readable instructions may include one or more computer program components. The one or more computer program components may include one or more of an environment state component, a homepage component, a user input component, an update component, a user interface component, and/or other components.

The environment state component may be configured to manage environment state information maintaining a collaboration environment and/or other information. The collaboration environment may be configured to facilitate interaction by users with the collaboration environment and/or each other. The environment state information may include one or more of user records, work unit records, project records, and/or other records. The user records may include user information comprising values of user parameters associated with the users of the collaboration environment. The work unit records may include work information comprising values of work unit parameters associated with units of work managed, created, and/or assigned within the collaboration environment. The project records may include project information comprising values of project parameters associated with projects managed within the collaboration environment. A project may include one or more units of work.

The homepage component may be configured to manage homepage information defining personalized graphical user interfaces of the collaboration environment. Individual personalized graphical user interfaces may correspond to individual users. The individual personalized graphical user interfaces may include individual sets of interface elements configured to display one or more values of one or more of the user parameters, the work unit parameters, the project parameters, and/or other parameters associated with the individual users. By way of non-limiting illustration, the homepage information may define a first personalized graphical user interface corresponding to a first user. The first personalized graphical user interface may display a first set of values of one or more of the user parameters, the work unit parameters, the project parameters, and/or other parameters associated with the first user.

The user input component may be configured to obtain input information conveying user input into the personalized graphical user interfaces. The user input may specify which of the values are to be displayed in individual interface elements in the individual sets of interface elements. By way of non-limiting illustration, the input information may convey first user input from the first user. The first user input may include specification of one or more of the values in the first set of values displayed in the first personalized graphical user interface.

The user interface component may be configured to effectuate presentation of the personalized graphical user interfaces on computing platforms associated with the users upon instantiation of the collaboration environment by the users via computing platforms. By way of non-limiting illustration, upon instantiation of the collaboration environment by the first user, the first personalized graphical user interface may be presented on a first computing platform associated with the first user.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
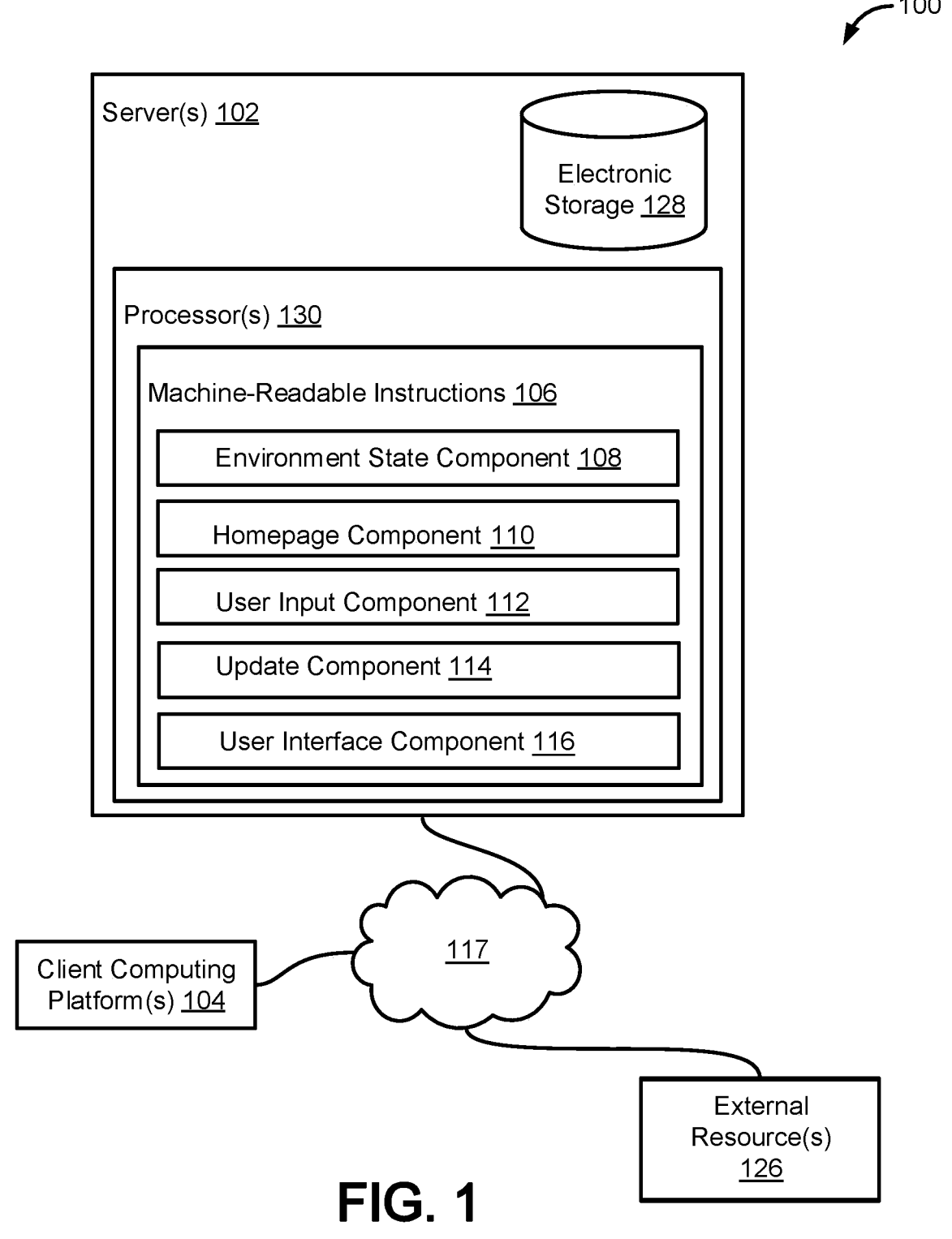
FIG. 1 illustrates a system configured to provide personalized graphical user interfaces within a collaboration environment, in accordance with one or more implementations.

FIG. 1 illustrates a system 100 configured to provide personalized graphical user interfaces within a collaboration environment, in accordance with one or more implementations. The personalized graphical user interfaces may include sets of interface elements presenting information pertinent to the work users are involved in. The personalized graphical user interface may represent a landing page (sometimes referred to as a "homepage") when the users instantiate (e.g., launch) the collaboration environment on their computing platform. Providing users with a personalized graphical user interface may be useful when starting their day. Users may easily prioritize their work and jump into the work that matters most.

In some implementations, system 100 may include one or more of one or more servers 102, one or more client computing platforms 104, external resource(s) 126, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 and/or instances of the collaboration environment via client computing platform(s) 104.

Server(s) 102 may include one or more of non-transitory electronic storage 128, one or more processors 130 configured by machine-readable instructions 106, and/or other components. The non-transitory electronic storage 128 may store one or more records and/or other information. Machine-readable instructions 106 may include one or more instruction components. The instruction components may include computer program components. Executing the machine-readable instructions 106 may cause server(s) 102 to facilitate providing personalized graphical user interfaces within a collaboration environment. The computer program components may include one or more of an environment state component 108, a homepage component 110, a user input component 112, an update component 114, a user interface component 116, and/or other components.

Environment state component 108 may be configured to manage environment state information and/or other information used in maintaining a collaboration environment. The collaboration environment may be configured to facilitate interaction by users with the collaboration environment. The environment state information may include one or more of user records, work unit records, project records, objective records, and/or other records. The user records may include user information comprising values of user parameters associated with the users of the collaboration environment. The work unit records may include work information comprising values of work unit parameters associated with units of work managed, created, and/or assigned within the collaboration environment. The project records may include project information comprising values of project parameters associated with projects managed within the collaboration environment. The objective records may include objective information comprising values for objective parameters associated with business objectives defined within the collaboration environment.

The work information in the work unit records may include values of one or more work unit parameters. The values of the work unit parameters may be organized in work unit records corresponding to units of work managed, created, and/or assigned within the collaboration environment. A given unit of work may have one or more assignees and/or collaborators working on the given work unit. Units of work may include one or more to-do items, action items, objectives, and/or other units of work one or more users should accomplish and/or plan on accomplishing. Units of work may be created by a given user for the given user and/or created by a given user and assigned to one or more other users. Individual units of work may include one or more of an individual task, an individual sub-task, and/or other units of work assigned to and/or associated with one or more users. Individual units of work may include one or more digital content items. An individual unit of work may include an individual digital content item by virtue of the individual digital content item (and/or a copy or instance thereof) being attached and/or appended thereto. A digital content item may include one or more of an image, a video, an audio file, a PDF, a word document, and/or other digital content items.

In some implementations, units of work created by, assigned to, and/or completed by the users may refer generally to a linking of the units of work with the individual users in the collaboration environment. A unit of work may be linked with a user in a manner that defines one or more relationships between the user and the unit of work. Such a relationship may connote and/or be a result of an action (past, present, and/or future) of the user with respect to the unit of work. Such actions may include one or more of creating a work unit record for a unit of work, being assigned to participate in a unit of work, participating in a unit of work, being granted access to a work unit record of a unit of work, adjusting a value of a work unit parameter of a work unit record of a unit of work, and/or other actions.

Individual sets of work unit records may be defined by a record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define a unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access by one or more users unless and/or until a subordinate work unit record is completed and/or started.

Individual work unit records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

In some implementations, values of work unit parameters may include one or more of a unit of work name, a unit of work description, one or more unit of work dates (e.g., a start date, a due date or end date, a completion date, and/or dates), one or more users linked to a unit of work (e.g., an owner, one or more collaborators, collaborator access information, and/or other information), role information, a status parameter (e.g., an update, a hardcoded status update, a completed/incomplete/mark complete, a measured status, a progress indicator, quantity of sub-work units remaining for a given unit of work, measure of urgency, and/or other status parameter), one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters), one or more interaction parameters (e.g., indicating a given unit of work is being worked on/was worked on, a given work unit of work was viewed, a given unit of work was selected, how long the given unit of work has been idle, a last interaction parameter indicating when and what user last interacted with the given unit of work, users that interacted with the given unit of work, quantity and/or content of comments on the unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, subtasks within a task, etc. . . . ), state of a workspace for a given unit of work (e.g., application state parameters, application status, application interactions, user information, and/or other parameters related to the state of the workspace for a unit of work), one or more performance/productivity metrics for a given unit of work, hierarchical information, one or more custom fields (e.g., priority, cost, stage, and/or other custom fields), and/or other information.

In some implementations, the one or more work unit parameters may include one or more of a work assignment parameter, work completion parameter, a work management parameter, a work creation parameter, and/or other parameters. The values of the work assignment parameter may describe and/or identify users assigned to the individual units of work. The values of the work management parameter may describe and/or identify users who manage the individual units of work. The values of the work creation parameter may describe the creation of individual units of work (e.g., when it was created, who created it, etc.).

The values of the work assignment parameter describing and/or identifying users assigned to the individual units of work may be determined based on one or more interactions by one or more users with a collaboration environment. In some implementations, one or more users may create and/or assign one or more units of work to themselves and/or another user. In some implementations, a user may be assigned a unit of work and the user may effectuate a reassignment of the unit of work from the user or one or more other users.

In some implementations, values of the work completion parameter may indicate that a status a unit of work has changed from "incomplete" to "marked complete" and/or "complete". In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date).

In some implementations, managing by the environment state component 108 may include maintaining queues of the units of work assigned to the users. The queues may be presented to the users in a user interface of the collaboration environment to facilitate access to the units of work via work unit pages. Individual queues may represent the units of work assigned to individual users organized in an order based on the individual end dates and/or other dates (e.g., start dates) and/or other ordering. Individual queues may be presented in a user interface based on one or more of a list view, a calendar view, and/or other views. The calendar view may be a calendar view by week, by more than one week (e.g., $1^{st}$ through $15^{th}$), by month, by more than one month (e.g., May through July), and/or other calendar views. Units of work may be represented in a calendar view by user interface elements (e.g., icons, calendar entries, etc.).

Project information in project records may define values of project parameters for projects created and/or managed within the collaboration environment. The project parameters may characterize one or more projects managed within the collaboration environment and/or via the collaboration environment, and/or the metadata associated with the one or more projects. Individual ones of the projects may be associated with individual ones of the project records. The project information may define values of the project parameters associated with a given project managed within the collaboration environment and/or via the collaboration environment. A given project may have one or more owners and/or one or more collaborators working on the given project. The given project may include one or more units of work assigned to one or more users under a given project heading. In some implementations, projects may include one or more units of work that may directly facilitate progress toward fulfillment of the projects. Accordingly, completion of the set of units of work may directly contribute to progress toward fulfillment of the project. By way of non-limiting illustration, an individual project may be associated with a client and the units of work under the individual project heading may be work directly contributing to the fulfillment of a business relationship with the client.

The values of the project parameters may, by way of non-limiting example, include one or more of: one or more units of work supporting individual ones of the projects (which may include values of work unit parameters included in one or more work unit records), one or more users linked to the project (which may include values of user parameters defined by one or more user records), role information, one or more user comment parameters (e.g., a creator, a recipient, one or more followers, one or more other interested parties, content, one or more times, upvotes, other hardcoded responses, etc.), a project name, a project description and/or background summary, a project problem statement, a project solution statement, one or more risks associated with the project, one or more project dates (e.g., a start date, a due date, a completion date, and/or other project dates), one or more project collaborators (e.g., an owner, one or more other project collaborators, collaborator access information, and/or other information), a status and/or progress (e.g., an update, a hardcoded status update, a measured status, quantity of units of work remaining in a given project, completed units of work in a given project, and/or other status parameter), one or more resources, one or more business objectives supported by the projects, notification settings, permissions information, an associated URL, one or more interaction parameters (e.g., sources of the interactions, context of the interactions, content of the interactions, time for the interactions, and/or other interaction parameters), updates, ordering of units of work within the given project, state of a workspace for a given task within the given project, and/or other information.

In some implementations, project records may include permissions information for the individual projects. The permissions may specify access restrictions for the individual project. The access restrictions may be specified on a user-basis, user role-bases (e.g., based on one or more of organization role, role in units of work, and/or project-level role), for groups of users, and/or specified in other ways.

Role information may be specified in one or more of the work unit records, project records, user records, and/or other records. The role information may specify roles of the users within the units of work, the projects, and/or a business organization as a whole. The roles may convey expected contribution of the users in completing and/or supporting the units of work and/or the projects. The individual roles of individual users within the units of work may be specified separately from the individual roles of the individual users within the projects. The project parameters may include a project role parameter characterizing the individual roles of the individual users with respect to individual projects.

A role may represent expected contribution of the users in completing and/or supporting the units of work and/or the projects. A role specified with respect to units of work and/or projects may be different from roles traditionally specified with respect to a business organization as a whole (e.g., President, CEO, intern, product designer, legal counsel, etc.). For example, an organization role may be "Product Designer"; a project role may be "Design Lead"; and a role on an individual unit of work may be "Approver."

A role within a unit of work may be specified based on one or more of a job title, a description of what the user should accomplish and/or plan on accomplishing for the given unit of work, and/or other specifications. By way of non-limiting illustration, a role within a unit of work may include one or more of general assignee, graphic designer, engineer, tester, writer, artist, mechanic, and/or other descriptions.

A role within a project (e.g., a "project-level role") may be specified based on a description of what the user may be supporting and/or plan on supporting for the given project, and/or other specifications. By way of non-limiting illustration, a role within a project may include one or more of owner, design, marketing, copy, legal, engineering, art director, and/or other descriptions. Although the specification of the role in a project may include the same or similar words as the role in a unit of work, the role in the project may enable and/or disable features within the collaboration environment otherwise not available to users of having roles in individual units of work but not at the project level. In some implementations, roles within a project may take on a more supervisory connotation than the roles within the individual units of work.

The objective information in objective records may include values of one or more objective parameters. The values of the objective parameters may be organized in objective records corresponding to business objectives managed, created, and/or owned within the collaboration environment. A given business objective may have one or more collaborators, and/or team members working on the given business objective. Business objectives may include one or more associated units of work and/or projects one or more users should accomplish and/or plan on accomplishing. Business objectives may be created by a given user for the given user and/or created by the given user and assigned to be owned to one or more other users. Individual business objectives may include one or more of an individual goal, an individual sub-goal, and/or other business objectives assigned to be owned by a user and/or associated with one or more users.

The business objectives may be associated with a set of units of work and/or projects that may indirectly facilitate progress toward fulfillment of the business objectives. The set of units of work and/or projects may not directly contribute to the progress. By way of non-limiting illustration, a connection between the set of units of work and/or projects and a corresponding business objective may be indirect in that completion of at least one of the units of work and/or projects may have no direct impact on progress toward fulfillment of the business objective. The concept of "no direct impact" may mean that completion of the at least one unit of work and/or project may not cause progress toward fulfillment of the business objective without independent action outside of the at least one unit of work and/or project. Instead, the fulfillment of the at least one unit of work and/or project may make such independent action more likely (e.g., through coercion, assistance, education, incentivization, reminder, etc.). However, in some implementations, business objectives may be associated with a set of units of work and/or projects that may directly facilitate progress toward fulfillment of the business objectives. Accordingly, completion of the set of units of work and/or projects may directly contribute to the progress toward fulfillment. Business objectives may be associated with an objectives and key result (OKR) goal-setting framework. Business objectives may be specified on one or more of a team basis, organization basis, and/or other specifications. In some implementations, business objectives may be characterized as user objectives. The user objectives may be associated with a set of units of work and/or projects that may indirectly (and/or directly) facilitate progress toward fulfillment of the user objectives. User objectives may be specified on an individual user basis.

Individual objective records may describe individual business objectives and identify sets of individual ones of the work unit records and/or project records that specify the units of work and/or projects as being associated with the individual business objectives.

Individual sets of objective records may be defined by an objective record hierarchy. An objective record hierarchy may convey individual positions of objective records (and their corresponding business objectives) in the objective record hierarchy. By way of non-limiting illustration, a position may specify one or more of an objective record being superior to one or more other objective records, an objective record being subordinate to one or more other objective records, and/or other information. As a result, individual objective records may be subordinate and/or superior to other individual objective records. For example, the objective records may further include a second objective record. The first objective record and the second objective record may be organized by a first objective record hierarchy specifying that the second objective record is subordinate to the first objective record.

An objective record may define a business objective comprising a progress towards fulfillment, and a subordinate objective record may define a business objective comprising a subordinate progress towards fulfillment to the subordinate business objective. An objective record hierarchy may define a relationship between objective records.

Individual objective records may include hierarchical information defining an objective record hierarchy of the individual objective records. The hierarchical information of an objective record may include one or more of information identifying other objective records associated in an objective record hierarchy the objective record belongs to, a specification of the position of the objective record in the hierarchy, other relationships placed on the objective record by virtue of its position, and/or other information.

In some implementations, as a consequence of the objective record hierarchies, the individual business objectives described in the individual objective records that are subordinate to the other individual objective records may be subordinate to the individual business objectives in the other individual objective records.

In some implementations, the one or more objective parameters may include one or more of an objective definition parameter, an objective owner parameter, an objective management parameter, an objective creation parameter, an objective progress parameter, and/or other parameters. The value of the objective definition parameter may describe the particular business objective. The values of the objective owner parameter may describe business objectives assigned to be owned by an individual user. The values of the objective management parameter may describe business objectives managed as collaborators by the individual users. The values of the objective creation parameter may describe business objectives created by the individual users.

In some implementations, the business objectives may be described based on one or more of a business objective name, a business objective description, one or more business objective dates (e.g., a start date, a due date, and/or dates), one or more members associated with a business objective (e.g., an owner, one or more other project/task members, member access information, and/or other business objective members and/or member information), progress information (e.g., an update, a hardcoded status update, a measured status, a progress indicator, quantity value remaining for a given business objective, completed work units in a given project, and/or other progress information), one or more interaction parameters, notification settings, privacy, an associated URL, one or more custom fields (e.g., priority, cost, stage, and/or other custom fields), and/or other information.

The values of the objective owner parameter describing business objectives owned by the individual users may be determined based on one or more interactions by one or more users with a collaboration environment. In some implementations, one or more users may create and/or assign ownership of one or more business objectives to themselves and/or another user. In some implementations, a user may be assigned to own a business objective and the user may effectuate a reassignment of ownership of the business objective from the user or one or more other users.

The user information in the user records may include values of user parameters. The values of the user parameters may be organized in user records corresponding to users interacting with and/or viewing the collaboration environment. The values of the user parameters may include information describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user.

The values of the user parameters may, by way of non-limiting example, specify one or more of: a user name, a group parameter, a user account, role information, a user department, descriptive user content, a to-email, a from-email, a photo, an organization, a workspace, one or more user comments, one or more teams the user belongs to, one or more of the user display settings (e.g., colors, size, project order, task order, other unit of work order, etc. . . . ), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), one or more notification settings, one or more progress parameters, status information for one or more work units the user is associated with (units of work assigned to the user, assigned to other users by the user, completed by the user, past-due date, and/or other information), one or more performance/productivity metrics of a given user (e.g., how many units of work the user has completed, how quickly the user completed the units of work, how quickly the user completes certain types of work units, the efficiency of the user, bandwidth of the user, activity level of the user, how many business objectives the user has helped fulfill through their completion of units of work, etc.), application access information (e.g., username/password for one or more third-party applications), collaborator information, one or more favorites and/or priorities, schedule information, and/or other information.

In some implementations, collaborator information may specify a frequency at which one or more users collaborate with each other on a given unit of work and/or project. In some implementations, a "frequency" may be defined with respect to a threshold. A threshold may include at least one collaboration. A collaboration may include at least one action taken with respect to a given record. The action may include one or more of adding comments, sending direct communications, co-authoring content, conducting meetings, establishing assignee/assignor relationships, marking complete, marking incomplete, reassigning, and/or other actions. A threshold may include at least one collaboration with respect to at least one record. A threshold may include one or more collaborations over a given period of time. In some implementations, collaborator information may establish users as "frequent" collaborators with other users(s) on individual units of work and/or projects, and/or "infrequent" collaborators with other users(s) on individual units of work and/or projects.

The homepage component 110 may be configured to manage homepage information defining personalized graphical user interfaces of the collaboration environment. Individual personalized graphical user interfaces may correspond to individual users. The individual personalized graphical user interfaces may include individual sets of interface elements configured to display one or more of the values of one or more of the parameters defined within the environment state information. By way of non-limiting illustration, the individual sets of interface elements configured to display one or more of the values of one or more of the user parameters, the work unit parameters, the project parameters, and/or other parameters. By way of non-limiting illustration, the homepage information may define a first personalized graphical user interface corresponding to a first user. The first personalized graphical user interface may display a first set of values of one or more of the user parameters, the work unit parameters, the project parameters, and/or other parameters associated with the first user.

The values of the user parameters associated with an individual user and displayed in an individual personalized graphical user interface may include the collaborator information and/or other information. By way of non-limiting illustration, the values of the user parameters associated with an individual user and displayed in an individual personalized graphical user interface may characterize other users the individual users collaborate with and/or the messages sent to and/or from the other users. In some implementations, individual ones of the other users may be characterized by frequency of collaboration on units of work and/or projects. In some implementations, the individual ones of the other users may be characterized by the communications sent via textual messages. The frequency of communications may be defined as the most recent communications. In some implementations, the frequency of communications may be defined as the threshold of communications over a period of time.

The personalized graphical user interface may display information in the form of visual graphics. By way of non-limiting illustration, a portion of the personalized graphical user interface may display graphics representing frequent collaborators associated with an individual user. One or more interface elements representing the frequent collaborators may be interactive. In some implementations, when an interface element is selected representing a frequent collaborator, there may be a portion of the user interface that displays information about the frequent collaborator. The information displayed may include one or more of units of work assigned to the frequent collaborator, information identifying the frequent collaborator (e.g., name, username, email, phone number, avatar, and/or other information), content of collaborations between the individual user and the frequent collaborator, and/or other information. By way of non-limiting illustration, content of collaborations between the individual user and the frequent collaborator may include messages communicated between the individual user and the frequent collaborator. In some implementations, a portion of the personalized graphical user interface may display content of the messages in a portion dedicated to display messages. The messages may be organized by way of the latest messages sent or the highest frequency of messages sent between the individual user and the frequent collaborator. The manner in which the conversation list is presented may be pre-determined by the system and/or manually configured by the individual user.

The values of the work unit parameters associated with an individual user and displayed in an individual personalized graphical user interface may characterize one or more of the units of work assigned to the individual user. In some implementations, the one or more of the units of work assigned to the individual user presented in a personalized graphical user interface may include units of work having due dates approaching within a given timeframe. In some implementations, the one or more of the units of work assigned to the individual user presented in a personalized graphical user interface may include units of work assigned to the individual user and linked to one or more frequent collaborators. In some implementations, the values of the work unit parameters of one or more units of work associated with an individual user that have due dates approaching a given timeframe may characterize the units of work as being past due with respect to the given timeframe. In some implementations, the values of the work unit parameters of one or more units of work associated with an individual user that have due dates approaching a given timeframe may characterize the units of work as being presently due (e.g., on the current day). In some implementations, the values of the work unit parameters of one or more units of work associated with an individual user that have due dates approaching a given timeframe may characterize the units of work as nearing the given due date.

In some implementations, the values of the work unit parameters of one or more units of work presented in a personalized graphical user interface in may be organized based on the units of work being one or more of past a due date, presently due, and/or nearing the due date. In some implementations, the values may be presented as an arrangement of interface elements. The arrangement may be organized by one or more of pressing deadlines, frequency of activity, specific collaborators, and/or other considerations of organization.

The values of the project parameters associated with an individual user and displayed in an individual personalized graphical user interface may characterize one or more of the projects associated with the individual user. In some implementations, the values of the project parameters associated with an individual user may characterize one or more of the projects by specifying roles of individual users in one or more of the projects. By way of non-limiting illustration, one or more projects which an individual user has a managerial role may be displayed in a portion of the personalized graphical user interface.

In some implementations, the values of the project parameters associated with an individual user may characterize one or more of the projects by specifying the collaborators associated with the one or more projects. By way of non-limiting illustration, the one or more projects associated with an individual user and specific collaborators may be displayed in a portion of the personalized graphical user interface.

In some implementations, the values of the project parameters associated with an individual user may characterize one or more projects based on the individual user's frequency of visitation to individual project pages of the individual projects. In some implementations, visitation may be considered "frequent" if there are two or more visitations by the individual user to the individual project pages. In some implementations, visitation may be considered "frequent" if there are two or more visitations by the individual user to the individual project pages within a given timeframe. By way of non-limiting illustration, the one or more projects associated with frequent visitations may be displayed in a portion of the individual personalized graphical user interface.

In some implementations, an individual user's association with one or more projects may be defined by the user directly contributing to the one or more projects. An individual user may directly contribute to the one or more projects by the user being responsible for one or more units of work which affects the progress of the project's successful completion. By way of non-limiting illustration, the one or more projects associated with the individual user directly contributing may be displayed in a portion of the personalized graphical user interface.

In some implementations, an individual user's indirect association with one or more projects may be defined by a project having high activity. By way of non-limiting illustration, the one or more projects indirectly associated with the individual user may be displayed in a portion of the personalized graphical user interface if there have been many units of work completed within the one or more projects. By way of non-limiting illustration, the one or more projects indirectly associated with the individual user may be displayed in a portion of the personalized graphical user interface if there has been a high amount of communication between other users within one or more projects.

In some implementations, displaying the values of parameters may include determining visual representations of the values. The visual representations may be one or more of numeric representations, graphical representations (e.g., charts, graphs, etc.), and/or other representations. In some implementations, visual representations may be direct representations. By way of non-limiting illustration, a value of a parameter may be directly presented in a personalized graphical user interface. For example, a value of a project parameter for a project specifying that the project includes ten tasks may be represented in an interface element as "This project has ten tasks." In some implementations, visual representations may be indirect representations. By way of non-limiting illustration, a value of a work unit parameter may be used as a basis for determining a display that represents the value but may not directly and/or explicitly convey the value. By way of non-limiting illustration, a value of a work unit parameter for a unit of work specifying that the unit of work is past due may be represented in a visual graphic that draws the users attention to it more than other elements displayed on the user interface.

It is noted that the interface elements of the personalized graphical user interfaces may be organized in different ways according to the kinds of parameters being included in the personalized graphical user interface.

In some implementations, the personalized graphical user interfaces may provide access to one or more of the user records, the work unit records, the project records, and/or other records associated with the one or more of the values displayed in the personalized graphical user interfaces.

In some implementations, the one or more interface elements may be pre-configured on the personalized graphical user interfaces, corresponding to predetermined ones of the parameters. This may include values(s) of parameters having the relatively most change in relation to other values, value(s) of parameters having the relatively most user interaction in relation to the values than other values of parameters, and/or other considerations. By way of non-limiting illustration, if monitoring use of the collaboration environment by a set of users shows that the users update the description of a project (e.g., which is a value of a project parameter) on a continuing monthly basis, then the description of the project may be determined to have been impacted the most. Accordingly, the personalized graphical user interface may include at least one interface element preconfigured to display the project description in a personalized graphical user interface. By way of non-limiting illustration, if monitoring use of the collaboration environment by a set of users shows that the users frequently view the completed units of work in a project (which is a value of a project parameter) to determine the number of completed units of work compared to complete units of work, then the completed units of work in a project may be determined to have been impacted the most. Accordingly, the user interface may include at least one dynamic interface element (e.g., a software widget) pre-configured to display the number of completed units of work (or a chart showing the relationship between completed and incomplete units of work) in a personalized graphical user interface. In some implementations, the user interface may include a dynamic interface element displaying the number of units of work a user contributed on in a personalized graphical user interface. Contribution may include collaboration with a user linked to a unit of work, commented on, added attachments, and/or other considerations of contribution.

In some implementations, the personalized graphical user interfaces of the collaboration environment may be separate and distinct from individual views of the collaboration environment that display queues of the units of work assigned to the individual users. In some implementations, the personalized graphical user interfaces of the collaboration environment may be separate and distinct from individual pages that provide access to individual records. By way of non-limiting illustration, the personalized graphical user interfaces of the collaboration environment may be separate and distinct from one or more of user pages that provide access to individual user records, work unit pages that provide access to individual work unit records, project pages that provide access to individual project records, objective pages that provide access to individual objective records, and/or other pages that provide access to individual records.

The user input component 112 may obtain input information conveying user input into the personalized graphical user interfaces. The user input may specify which of the values are to be displayed in individual interface elements in the individual sets of interface elements. By way of non-limiting illustration, the input information may convey first user input from the first user. The first user input may specify one or more of the values in the first set of values displayed in the first personalized graphical user interface.

In some implementations, the user input may include identifying one or more of the individual users, individual units of work, individual projects, and/or other information. The user input may specify which of the values of the one or more of the parameters should be displayed in the individual interface elements of their personalized graphical user interface. A user may provide drag-and-drop input (and/or other input) via the interface elements to specify which values they should display. The input may cause the individual interface elements to take on the values of the given parameter thereby facilitate the generation of the personalized graphical user interfaces.

The update component 114 may be configured to monitor use of the collaboration environment by the users to determine change in the values of parameters of the collaboration environment. In some implementations, update component 114 may be configured to dynamically update the personalized graphical user interfaces based on the change in the values.

In some implementations, change in values may include one or both of user-initiated change in the values and/or automated change in the values. By way of non-limiting illustration, users may directly interact with the collaboration environment which causes change to one or more values. By way of non-limiting illustration, the collaboration environment may be configured with one or more automation rules that cause one or more values to change in response to trigger events.

In some implementations, environment state information may be updated as users continue to interact with the collaboration environment via the user interfaces over time. The environment state component 108 may store and/or archive the environment state information periodically and/ or based on user request to archive. In some implementations, the environment state component 108 may store historical environment state information specifying historical user information, historical work information, historical project information, historical objective information, user interaction history, and/or other information.

The user interface component 116 may be configured to effectuate presentation of the personalized graphical user interfaces on computing platforms associated with the users. In some implementations, user interface component 116 may be configured to effectuate presentation of the personalized graphical user interfaces on computing platforms associated with the users upon instantiation of the collaboration environment by the users via the computing platforms. By way of non-limiting illustration, upon instantiation of the collaboration environment by the first user, the first personalized graphical user interface may be presented on a first computing platform associated with the first user.

Figure 3:
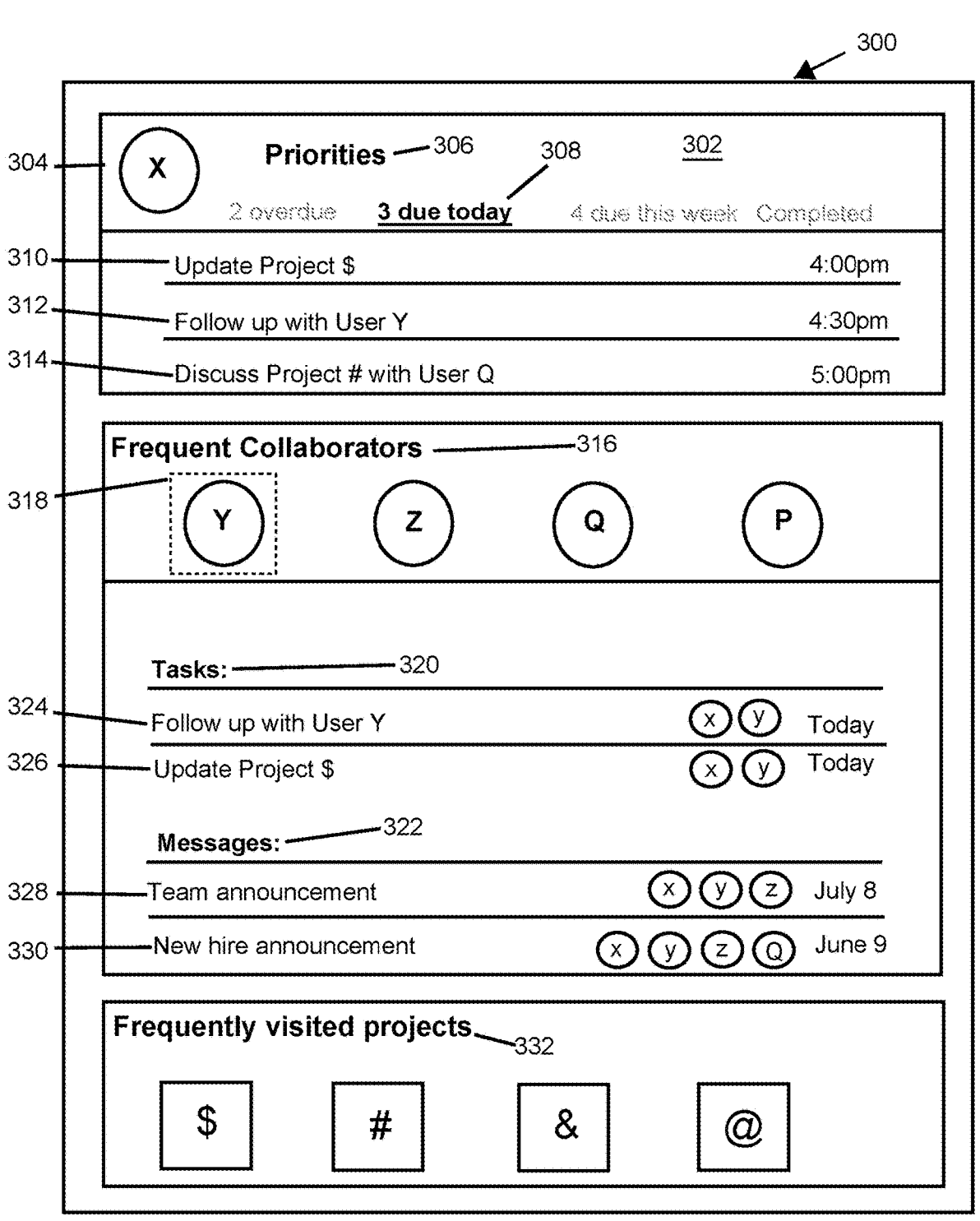
FIG. 3 illustrates a user interface, in accordance with one or more implementations.

FIG. 3 illustrates a user interface 300, in accordance with one or more implementations. The user interface 300 may include a view of a collaboration environment. In particular, the user interface 300 may comprise a personalized graphical user interface 302 for a user 304, illustrated as user "X". The personalized graphical user interface 302 may be comprised of different portions including one or more interface elements displaying one or more values of one or more of the user parameters, work unit parameters, project parameters, and/or other parameters.

The personalized graphical user interface 302 may comprise a first portion 306, illustrated as "Priorities". The first portion 306 may display values of work unit parameters for units of work assigned to the user and satisfying one or more due date criteria. The first portion 306 may be comprised of deadline driven categories 308, illustrated by three different categories where the "due today" category 308 is selected. The "due today" category 308 may be comprised of interface elements corresponding to lists of units of work. A first unit of work 310 for the due today category 308 may display "Update Project $". A second unit of work 312 for the due today category 308 may display "Follow up with User Y". A third unit of work 314 for the due today category 308 may display "Discuss project # with User Q". Individual ones of the units of work may be selected to take the user to a work unit page for the units of work.

The personalized graphical user interface 302 may comprise a second portion 316, illustrated as "Frequent Collaborators". The second portion 316 may display values of one or more user parameter for users determined to be frequent collaborators with user X. The second portion 316 may be comprised of a roster of users which user X 304 frequently collaborates with, illustrated as four different users, "Y", "Z", "Q", and "P". Individual ones of the users may be selected to populate the personalized graphical user interface with information about the selected user. By way of non-limiting illustration, User Y 318 may be selected. The second portion 316 of the personalized graphical user interface 302 may comprise a list 320 of units of work, illustrated as "Tasks", which user X and user Y collaborate on. The list 320 may be comprised of interface elements corresponding to different ones of the values of work unit parameters for the units of work that user Y and user X collaborate on. Individual interface elements may be selected to take the user to a work unit page for the individual units of work. A first value of a work unit parameter for a first unit of work 324 may display a title, illustrated as "Follow up with User Y". A second value of a work unit parameter of a second unit of work 326 may display a title, illustrated as "Update Project $".

In some implementations, the second portion 316 of the personalized graphical user interface 302 may comprise a list 322 showing content of messages communicated between user X and user Y, illustrated as "Messages". The list 322 may be comprised of interface elements corresponding to different ones of the messages. Individual ones of the interface elements may be selected to take the user to a communication page (e.g., message board, chat log, etc.) for the individual messages. For example, the list 322 may display the messages that were exchanged between user X and user Y, illustrated as "Team announcement" 328, and "New hire announcement" 330.

The personalized graphical user interface 302 may comprise a third portion 332, illustrated as "Frequently visited projects". The third portion 322 may display information about records that a user frequently visits. By way of non-limiting illustration, the third portion 322 may be comprised of interface elements corresponding to values of project parameters for one or more project records that the user frequently visits. The third portion 332 may be comprised of a list of interface elements representing projects which user X frequently visits, illustrated as projects "$", "#", "&", and "@". Individual ones of the interface elements may be selected to take the user to a project page for the individual projects.

Figure 4:
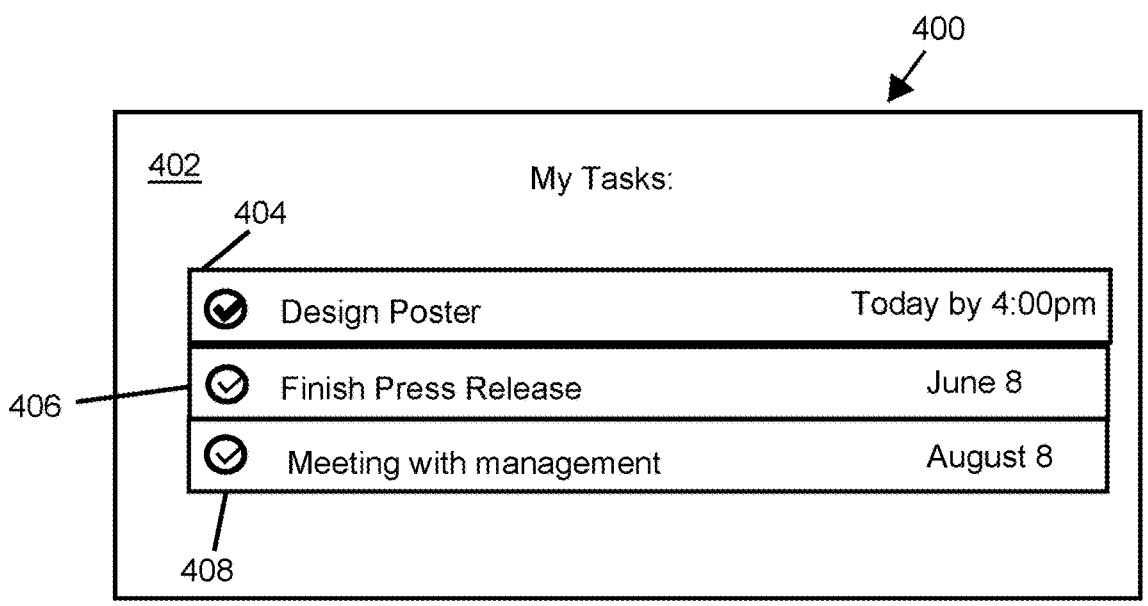
FIG. 4 illustrates a user interface, in accordance with one or more implementations.

FIG. 4 illustrates a user interface 400, in accordance with one or more implementations. The user interface 400 may include a view of a collaboration environment. In particular, the user interface 400 may a page 402 that displays a queue of the units of work assigned to a user, illustrated as "My Tasks." The queue may represent the units of work assigned to the user and/or organized in an order based on the individual end dates and/or other dates (e.g., start dates) and/or other ordering. By way of non-limiting illustration, the queue shown on the page 402 may include one or more of a first user interface element 404 representing a first unit of work, a second user interface element 406 representing a second unit of work, a third user interface element 408 representing a third unit of work, and/or other content. Individual ones of the user interface elements may be selected to take the user to individual work unit pages for the individual units of work. An individual work unit page may be a view within the collaboration environment dedicating to providing access to an individual work unit record. The individual work unit page may display values of one or more work unit parameters of the individual work unit record.

Figure 5:
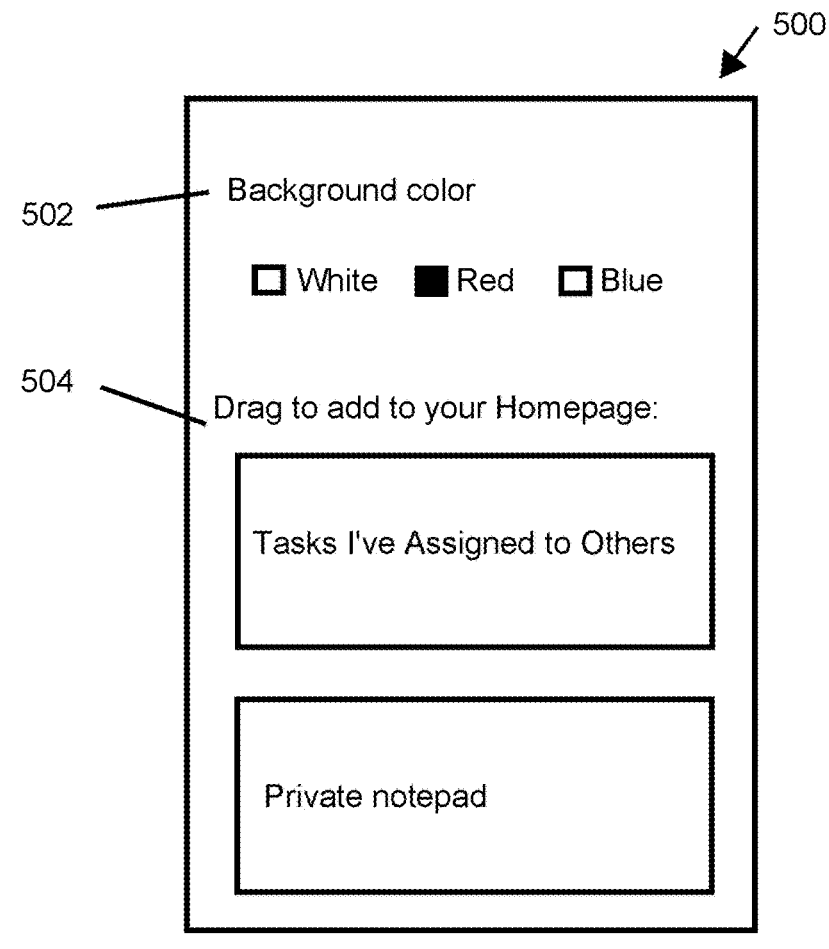
FIG. 5 illustrates a user interface, in accordance with one or more implementations.

FIG. 5 illustrates a user interface 500, in accordance with one or more implementations. The user interface 500 may represent a panel or window configured to facilitate customization of a personalized graphical user interface (e.g., user interface 300 in FIG. 3). The user interface 500 may be provided as a standalone window (e.g., pop up window), or as a side panel that may be a part of the personalized graphical user interface. The user interface 500 may be configured to receive user input to customize one or more of aesthetics of a personalized graphical user interface, the content of the personalized graphical user interface, and/or other features and/or functionality. By way of non-limiting illustration, a set of check boxes 502 may be provided to set the background color. By way of non-limiting illustration, a set of dynamic graphical user interface elements (e.g., widgets) 504 may be provided to add content to the personalized graphical user interface.

Referring back to FIG. 1, in some implementations, server(s) 102, client computing platform(s) 104, and/or external resource(s) 126 may be operatively linked via one or more electronic communication links. For example, such electronic communication links may be established, at least in part, via a network 117 such as the Internet and/or other networks. It will be appreciated that this is not intended to be limiting, and that the scope of this disclosure includes implementations in which server(s) 102, client computing platform(s) 104, and/or external resource(s) 126 may be operatively linked via some other communication media.

A given client computing platform may include one or more processors configured to execute computer program components. The computer program components may be configured to enable an expert or user associated with the given client computing platform to interface with system 100 and/or external resource(s) 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

Server(s) 102 may include electronic storage 128, one or more processors 130, and/or other components. Server(s) 102 may include communication lines, or ports to enable the exchange of information with a network 117 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

External resource(s) 126 may include sources of information outside of system 100, external entities participating with system 100, and/or other resources. In some implementations, some or all of the functionality attributed herein to external resource(s) 126 may be provided by resources included in system 100.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc. . . . ) or a drive (e.g., a disk drive, etc. . . . ). Electronic storage 128 may include one or more of optically readable storage media (e.g., optical disks, etc. . . . ), magnetically readable storage media (e.g., magnetic tape, magnetic hard drive, floppy drive, etc. . . . ), electrical charge-based storage media (e.g., EEPROM, RAM, etc. . . . ), solid-state storage media (e.g., flash drive, etc. . . . ), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, 116 and/or other components. Processor(s) 130 may be configured to execute components 108, 110, 112, 114, and/or 116 and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 130 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 130 may be configured to execute one or more additional components that may perform some or all of the functionality attributed below to one of components 108, 110, 112, 114, and/or 116.

Figure 2:
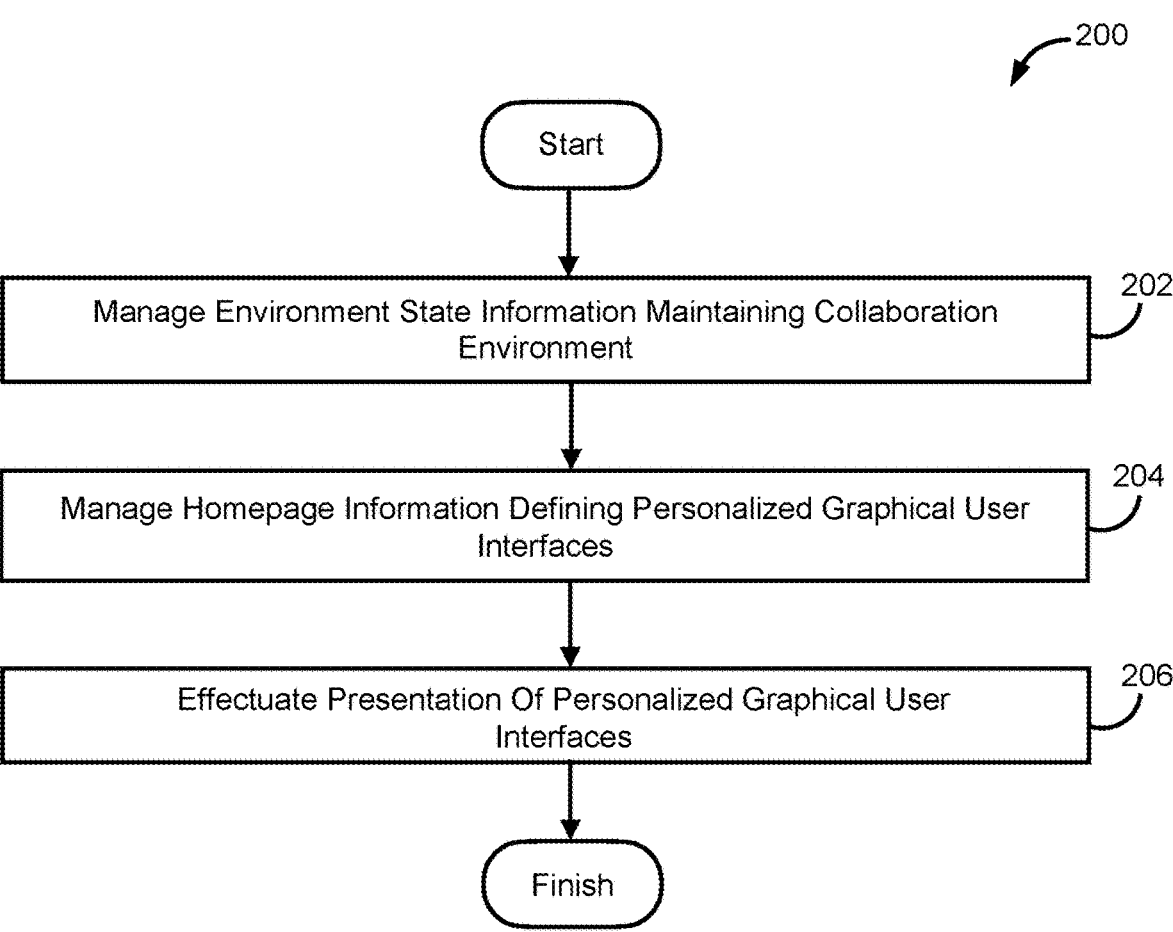
FIG. 2 illustrates a method to provide personalized graphical user interfaces within a collaboration environment, in accordance with one or more implementations.

FIG. 2 illustrates a method 200 to provide personalized graphical user interfaces within a collaboration environment, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment and/or other information. The collaboration environment may be configured to facilitate interaction by users with the collaboration environment. The environment state information may include one or more of user records, work unit records, project records, and/or other records. The user records may include values of user parameters associated with the users of the collaboration environment. The work unit records may include values for work unit parameters associated with units of work managed, created, and/or assigned within the collaboration environment. The project records may include values for the project parameters associated with projects managed within the collaboration environment. Operation 202 may be performed by one or more hardware processors configured by machine-readable instructions including a component that is the same as or similar to environment state component 108, in accordance with one or more implementations.

An operation 204 may manage homepage information defining personalized graphical user interfaces of the collaboration environment. The individual personalized graphical user interfaces may correspond to individual users. In some implementations, the individual personalized graphical user interfaces may include individual sets of interface elements configured to display one or more of the values of the user parameters, the work unit parameters, the project parameters, and/or other parameters associated with the individual users. By way of non-limiting illustration, the homepage information may define a first personalized graphical user interface corresponding to a first user. The first personalized graphical user interface may display a first set of values of the user parameters, the work unit parameters, and the project parameters associated with the first user. Operation 204 may be performed by one or more hardware processors configured by machine-readable instructions including a component that is the same as or similar to homepage component 110, in accordance with one or more implementations.

An operation 206 may effectuate presentation of the personalized graphical user interfaces on computing platforms associated with the users upon instantiation of the collaboration environment by the users via the computing platforms. By way of non-limiting illustration, upon instantiation of the collaboration environment by the first user, the first personalized graphical user interface is presented on a first computing platform associated with the first user. Operation 206 may be performed by one or more hardware processors configured by machine-readable instructions including a component that is the same as or similar to user interface component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide a user-customized graphical user interface page within a graphical user interface of a collaboration environment, the system comprising:

one or more physical processors configured by machine-readable instructions to:

manage homepage information defining a user-customized graphical user interface page of a graphical user interface of a collaboration environment, the user-customized graphical user interface page corresponding to one or more customizations made by a user with respect to selection of what should be presented in the user-customized graphical user interface page from a user record and one or more records for work, wherein the user-customized graphical user interface page of the collaboration environment is separate and distinct from individual user interface pages that are individually associated with the user record and individual records for work;

effectuate presentation of the user-customized graphical user interface page on a computing platform associated with the user upon instantiation of the collaboration environment via the computing platform; and cause navigation within the graphical user interface to the individual user interface pages based on user input into the user-customized graphical user interface page, such that:

responsive to the user input including selection of a first interface element of the user-customized graphical user interface page, cause a first navigation within the graphical user interface from the user-customized graphical user interface page to a first user page for the user record; and responsive to the user input including selection of a second interface element, cause a second navigation within the graphical user interface from the user-customized graphical user interface page to a first work page for a first record for work.

2. The system of claim 1, wherein the one or more physical processors are further configured by the machine-readable instructions to:

obtain input information conveying further user input into the user-customized graphical user interface page, the further user input specifying the selection of what should be presented in the user-customized graphical user interface.

3. The system of claim 1, wherein the one or more physical processors are further configured by the machine-readable instructions to:

manage environment state information maintaining the collaboration environment, the collaboration environment being configured to facilitate interaction by the user with the collaboration environment, the environment state information including the user record and the one or more records for work, the user record including user information associated with the user of the collaboration environment, the one or more records for work including information associated with work managed, created, and/or assigned to the user within the collaboration environment; and wherein the user information displayed in the user-customized graphical user interface page characterizes other users the user collaborates with, and/or messages sent to and/or from the user.

4. The system of claim 1, wherein information from the one or more records for work displayed in the user-customized graphical user interface page includes characterizations of work assigned to the user that have approaching due dates.

5. The system of claim 1, wherein information from the one or more records for work displayed in the user-customized graphical user interface page includes characterizations of projects associated with the user.

6. The system of claim 1, wherein the first work page provides access to the first record for work.

7. The system of claim 1, wherein the one or more physical processors are further configured by the machine-readable instructions to:

monitor use of the collaboration environment by the user to determine change in the user record and/or the one or more records for work; and dynamically update the user-customized graphical user interface page based on the change.

8. The system of claim 7, wherein the change is derived from one or more automations.

9. The system of claim 1, wherein the user-customized graphical user interface page of the collaboration environment is separate and distinct from a page that displays a queue of work assigned to the user.

10. The system of claim 1, wherein records for work include task records, project records, and objective records.

11. A method to provide a user-customized graphical user interface page within a graphical user interface of a collaboration environment, the method comprising:

managing homepage information defining a user-customized graphical user interface page of a graphical user interface of a collaboration environment, the user-customized graphical user interface page corresponding to one or more customizations made by a user with respect to selection of what should be presented in the user-customized graphical user interface page from a user record and one or more records for work, wherein the user-customized graphical user interface page of the collaboration environment is separate and distinct from individual user interface pages that are individually associated with the user record and individual records for work;

effectuating presentation of the user-customized graphical user interface page on a computing platform associated with the user upon instantiation of the collaboration environment via the computing platform; and causing navigation within the graphical user interface to the individual user interface pages based on user input into the user-customized graphical user interface page, including:

responsive to the user input including selection of a first interface element of the user-customized graphical user interface page, causing a first navigation within the graphical user interface from the user-customized graphical user interface page to a first user page for the user record; and responsive to the user input including selection of a second interface element, causing a first navigation within the graphical user interface from the user-customized graphical user interface page to a first work page for a first record for work.

12. The method of claim 11, further comprising:

obtaining input information conveying further user input into the user-customized graphical user interface page, the further user input specifying the selection of what should be presented in the user-customized graphical user interface.

13. The method of claim 11, further comprising:

managing environment state information maintaining the collaboration environment, the collaboration environment being configured to facilitate interaction by the user with the collaboration environment, the environment state information including the user record and the one or more records for work, the user record including user information associated with the user of the collaboration environment, the one or more records for work including information associated with work managed, created, and/or assigned within the collaboration environment; and wherein the user information displayed in the user-customized graphical user interface page characterizes other users the user collaborates with, and/or messages sent to and/or from the user.

14. The method of claim 11, wherein information from the one or more records for work displayed in the user-customized graphical user interface page includes characterizations of work assigned to the user that have approaching due dates.

15. The method of claim 11, wherein information from the one or more records for work displayed in the user-customized graphical user interface page includes characterizations of projects associated with the user.

16. The method of claim 11, wherein the first work page provides access to the first record for work.

17. The method of claim 11, further comprising:

monitoring use of the collaboration environment by the user to determine change in the user record and/or the one or more records for work; and dynamically updating the user-customized graphical user interface page based on the change.

18. The method of claim 17, wherein the change is derived from one or more automations.

19. The method of claim 11, wherein the user-customized graphical user interface page of the collaboration environment is separate and distinct from a page that displays a queue of work assigned to the user.

20. The method of claim 11, wherein records for work include task records, project records, and objective records.

\* \* \* \* \*